Jan. 13, 1970     C. T. McMANUS     3,488,864
DEVICE FOR TEACHING MONETARY SKILLS
Filed Feb. 9, 1968
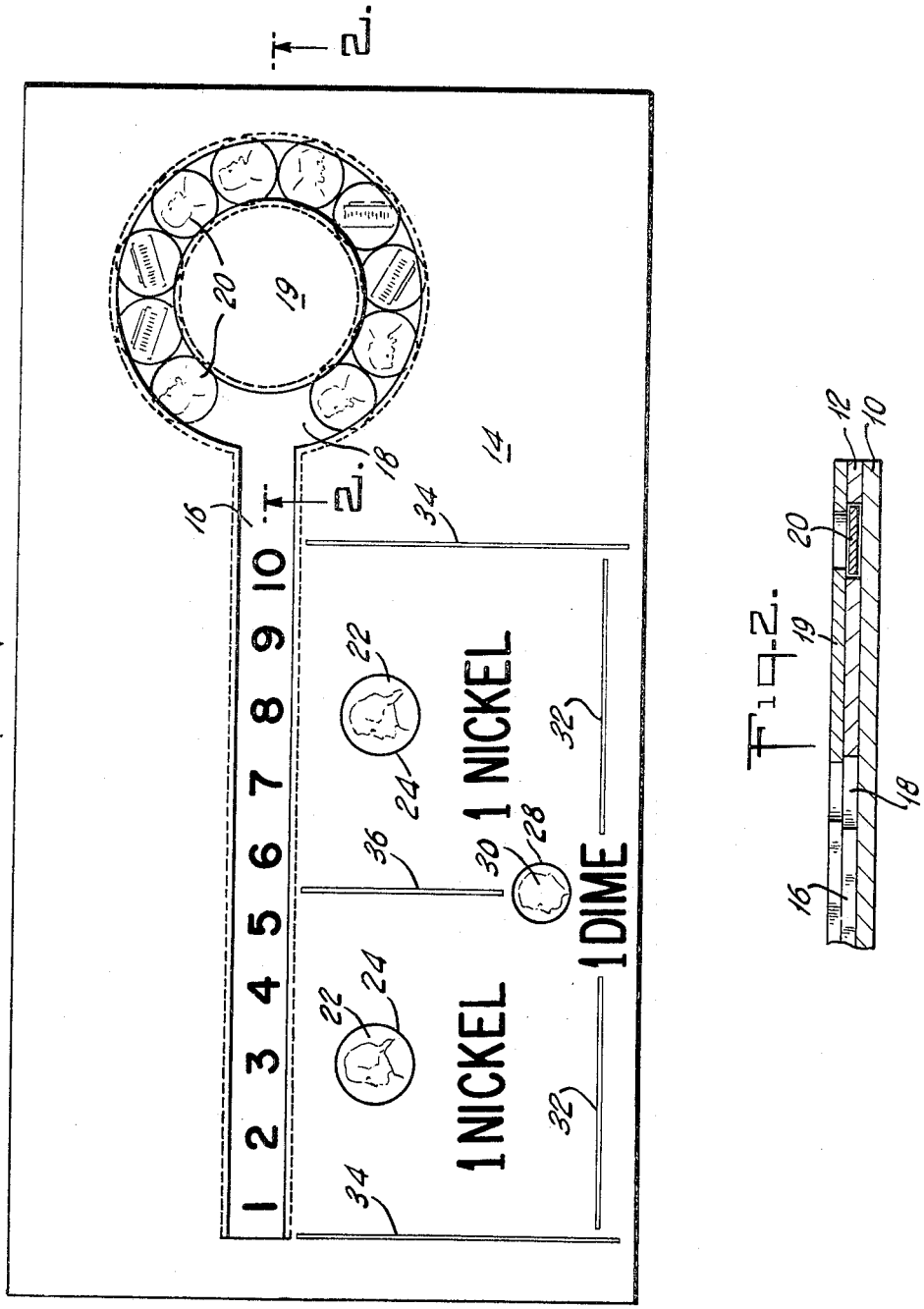
INVENTOR
CATHERINE THOMAS McMANUS
BY
Morgan, Finnegan, Durham, & Pine
ATTORNEYS

United States Patent Office 3,488,864
Patented Jan. 13, 1970

3,488,864
DEVICE FOR TEACHING MONETARY SKILLS
Catherine Thomas McManus, 3501 Solly Ave.,
Philadelphia, Pa. 19136
Filed Feb. 9, 1968, Ser. No. 704,353
Int. Cl. G09b *19/18;* A45c *11/24;* B65d *85/54*
U.S. Cl. 35—24      2 Claims

ABSTRACT OF THE DISCLOSURE

The invention provides a device for teaching simple monetary skills, especially to mentally retarded adults. On a surface are provided a space for holding a coin, adjacent spaces for holding coins of lower value which in total are equal to the first coin and a third, preferably linearly extending space connected with a coin-storage area from which coins may be moved into the third space to equal the value of the first coin and to the value of the coins in the second spaces. The second spaces extend for a total distance equal to the width of the first space, while the third space extends for a width equal to the total of the second spaces. Appropriate legends are applied to the surface so that the user is helped to relate these legends to the coins on the surface.

FIELD OF THE INVENTION

The teaching of simple monetary skills to mentally retarded adults has been found to require simpler teaching aids than those now available. The device of the present invention is especially intended for teaching those who have not learned that five cents equals one nickel, that two nickels equal one dime, or that ten cents equals one dime; and also those who have difficulty in identifying dimes, nickels and one-cent pieces and relating them to their relative values.

The device of the present invention insures that its user eventually learns that 5, not 4 or 6, one-cent pieces are equivalent to one nickel and not one dime, and that five cents and one nickel are equivalent to one dime.

SUMMARY OF THE INVENTION

In the teaching device of the present invention, there is provided an elongated channel to receive one-cent pieces from a communicating storage means. The bottom of the channel is provided with numerals which are so spaced that they are occluded as the one-cent pieces are moved from the storage area to the channel. Ten such numerals are provided and the channel is proportioned to receive ten one-cent pieces.

Adjacent one side of the channel is an area divided into two parts, one extending the width of five one-cent pieces and the other extending the width of the other five one-cent pieces. Each of these two areas is provided with means for receiving and locating a nickel, i.e. a five-cent piece. Adjacent the nickel receiving means is the legend "1 nickel" so that the user will associate the term with the proper coin.

Adjacent the side of the divided area opposite the channel is an area to receive a dime, i.e. a ten-cent piece, which has means for locating the coin and also for indicating that the value of the dime equals two nickels, as by laterally extending lines.

The means for receiving and locating each of the two nickels are preferably circular recesses of a size to receive a nickel, while the locating means for the dime is another circular recess of a diameter too small to receive a cent or a nickel.

Of the drawings:

FIGURE 1 is a top plan view of a device in accordance with the present invention; and
FIGURE 2 is a fragmentary sectional view taken on the line 2—2 of FIGURE 1.

DESCRIPTION OF THE PREFERRED EMBODIMENT

The illustrative and preferred embodiment of the invention is shown in the drawings and described with particular reference to a device for teaching the relationship between coins for cents, five-cent pieces and ten-cent pieces.

There is provided a baseboard 10 of any suitable material, such as Masonite or rigid plastic sheet. Adhered to the upper face of sheet 10 is a spacer layer 12, on top of which is adhered an apertured top layer 14, all of which layers may be of the same material.

Base 10 is preferably rectangular and layer 14 is substantially coextensive therewith.

Top layer 14 is provided with a longitudinal channel 16 sufficiently long to receive ten one-cent pieces in alinement. The bottom of the channel 16 is provided with numerals from 1 to 10, spaced so that each numeral may be occluded by one of the coins in the channel.

Top layer 14 is spaced from the base 10 by spacer layer 12 which is slightly thicker than the thickness of the coins to be received between them, and has a slightly larger opening than that of the channel 16 so that the coins may be easily moved therein although they cannot be removed therefrom because the edges of channel 16 in the top layer 14 are slightly narrower than the diameter of the one-cent pieces 20.

Channel 16 communicates with a storage means, formed as a circular channel 18 between the base 10 and top layer 14 and provided with a central retaining wall 19. Channel 18 holds ten one-cent pieces 20 which may be moved at will into or out of channel 16.

Adjacent one edge of channel 16 is an elongated divided area, having means for locating two nickels 22, one in each of the divisions of the area. Preferably, circular sockets 24 are provided into which the nickels fit rather snugly, but not so tight as to prevent their easy removal. Adjacent each socket 24 is the appropriate legend "1 nickel."

Below the two nickel areas is an area in which a dime 28 may be located in a circular socket 30. At either side of the socket 30 lines 32 extend for a distance to equal the distance on channel 16 to be occupied by ten one-cent pieces, and marginal lines 34 are provided to accentuate the equivalence of ten one-cent pieces with one dime. Also, a central marginal line 36 is provided to accentuate the fact that one nickel equals five one-cent pieces.

While the device has been described illustratively for use with one-, five- and ten-cent pieces, it is obvious that it may be adapted for use with coins of other denominations.

The invention in its broader aspects is not limited to the specific mechanisms shown and described but departures may be made therefrom within the scope of the accompanying claims without departing from the principles of the invention and without sacrificing its chief advantages.

What is claimed is:
1. A device for teaching monetary skills comprising a base member having a defined area and means for locating a coin in said area, said area being subdivided into parts, each subdivision having means for locating a coin of lesser value, the coins of lesser value in the subdivisions equalling the value of the first coin, and another elongated area coextensive with the subdivided area to receive coins of a third denomination smaller than the other two and extending a distance so that when filled it extends from one edge of the subdivided area to the opposite edge, and a coin storage area communicating with the elongated area whereby coins may be moved to fill the elongated area.

2. A device as claimed in claim 1 in which the first area is to receive a dime, each of the subdivided areas is to receive a nickel and the elongated area may receive ten one-cent pieces, the elongated area having numerals, each to be covered by a one-cent piece to indicate that five cents equal one nickel and that ten cents equal two nickels or one dime.

References Cited

UNITED STATES PATENTS

| | | | |
|---|---|---|---|
| 2,863,603 | 12/1958 | Doupnik | 232—5 |
| 3,258,113 | 6/1966 | Rohr et al. | 206—.83 |
| 3,323,644 | 6/1967 | Wells | 206—.83 |

EUGENE R. CAPOZIO, Primary Examiner

W. H. GRIEB, Assistant Examiner

U.S. Cl. X.R.

206—.83; 229—92.9